United States Patent Office 2,996,519
Patented Aug. 15, 1961

2,996,519
METHOD OF MAKING 2,2'-BIPHENYL LACTONE
John O. Hawthorne, Pittsburgh, and Myron H. Wilt, Monroeville, Pa., assignors to United States Steel Corporation, a corporation of New Jersey
No Drawing. Filed Apr. 8, 1960, Ser. No. 20,817
3 Claims. (Cl. 260—343.2)

This invention relates to a method of making the lactone of 2-hydroxy-2'-biphenylcarboxylic acid or 2,2'-biphenyl lactone. This compound has utility as a rodent repellent as will be more fully explained later and as a stabilizer to prevent deterioration of various materials by ultraviolet light, as explained in our United States Patent 2,905,570.

Numerous methods are known for the preparation of 2,2'-biphenyl lactone but they are all characterized by a low yield or the use of expensive starting material or reagent. We have invented a simple method for making the product with excellent yield (approaching the theoretical maximum) using a starting material available at low cost. Stated generally, our method comprises the peroxide oxidation of 2-formyl-2'-biphenylcarboxylic acid or derivatives thereof, in acetic-acid solution with sulfuric acid present. The oxidant is preferably peracetic acid although hydrogen peroxide may be used. The acid derivatives used may be esters such as methyl 2-formyl-2'-biphenylcarboxylate or acetals such as the dimethyl acetal of methyl 2-formyl-2'-biphenylcarboxylate.

A complete understanding of the invention may be obtained from the following detailed explanation of several typical examples of our method.

Example I 2-formyl-2'-biphenylcarboxylic acid (2.26 grams, 0.01 mole), melting in the range 132 to 135° C., was dissolved in 13 ml. glacial acetic acid at room temperature. Concentrated sulfuric acid (3 ml.) was added at 25° C., and then 40% peracetic acid (2 ml., 0.012 mole). At the end of 30 minutes at 25° C., the reaction mixture was poured onto approximately 75 grams of ice, and water was added to a volume of 200 ml. The precipitated product was collected, washed with water to remove acid, and dried in vacuo. The product weighed 1.93 grams and represented a 98.5% yield of 2,2'-biphenyl lactone melting in the range 90 to 93° C.

Example II

The dimethyl acetal of methyl 2-formyl-2'-biphenylcarboxylate (2.86 grams, 0.01 mole) was dissolved in glacial acetic acid (12 ml.). Concentrated sulfuric acid (3 ml.) was added with cooling, and then 40% peracetic acid (2 ml., 0.012 mole). After 15 minutes at room temperature, the reaction mixture was poured into approximately 100 grams of cracked ice. The solid product was water-washed free of acid and refluxed with 2 molar equivalents of aqueous sodium hydroxide. Undissolved material was removed by filtration, and 2,2'-biphenyl lactone was recovered by neutralization of the filtrate with carbon dioxide. The precipitated product (1.55 grams, 79% yield) was collected, washed with water and dried in vacuo.

Example III

Methyl 2-formyl-2'-biphenylcarboxylate (2.40 grams, 0.01 mole), melting in the range 46 to 49° C., was dissolved in 12 ml. glacial acetic acid. Concentrated sulfuric acid (3.0 ml.) was added at 25 to 35° C., and then 40% peracetic acid (2.0 ml., 0.012 mole). At the end of 15 minutes, the reaction mixture was poured onto 50 grams of cracked ice, and water was added to a volume of 200 ml. The precipitated 2,2'-biphenyl lactone was collected, washed with water to remove acid and dried in vacuo. The product, melting in the range 88 to 90° C., weighed 1.93 to 1.96 grams, representing a yield of 98 to 100%.

Example IV

Methyl 2-formyl-2'-biphenylcarboxylate (2.4 grams, 0.01 mole) was dissolved in glacial acetic acid (40 ml.). To this solution was added 30% hydrogen peroxide (2.0 ml., 0.02 mole) and sulfuric acid (one drop). The reaction mixture was refluxed one hour, then the acetic acid was removed by distillation at reduced pressure. The residue was refluxed with 10% sodium hydroxide, and the solution was filtered to remove a small amount of insoluble material. 2,2'-biphenyl lactone was precipitated by neutralization of the filtrate with carbon dioxide. The product when collected, washed with water and dried, weighed 1.04 grams (51% yield). Acidification to pH 1 of the aqueous mother liquor precipitated acidic material (a mixture of 2,2'-diphenic acid and 2-formyl-2'-biphenylcarboxylic acid).

It will be apparent that our invention provides an efficient process for the preparation of 2,2'-biphenyl lactone by the peroxide oxidation of 2-formyl-2'-biphenylcarboxylic acid and its derivatives. The starting materials may be compounds of the form:

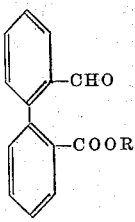

wherein R is hydrogen or a saturated alkyl radical containing 1 to 5 carbon atoms, or compounds of the form:

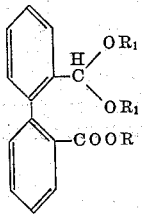

wherein $R_1$ is a saturated alkyl radical containing 1 to 3 carbon atoms, and R is a saturated alkyl radical containing 1 to 5 carbon atoms. When such compounds are treated with a peroxide oxidizing agent, such as peracetic acid or hydrogen peroxide, under the conditions described above, 2,2'-biphenyl lactone is produced in good yield.

Oxidation of these compounds by peracetic acid in sulfuric-acetic acids gave 97 to 100% yields of 2,2'-biphenyl lactone. The reaction appears to be of the Baeyer-Villiger type, probably involving 2-formoxy-2'-biphenylcarboxylic acid or its methyl ester as an intermediate, as indicated by the equation:

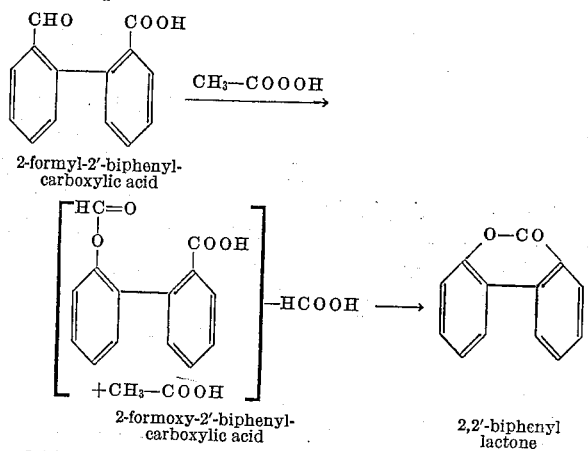

This preparative method for the lactone necessitates only a 10 to 20% excess of peracetic acid as the oxidant. Reaction times are short (7 to 30 minutes), the amount of sulfuric acid is not critical in the range 100 to 500 ml. per mole of starting material, and no addition of heat is required for the reaction. Dilution of the reaction mixture with water precipitates a practically colorless, 97 to 100% yield of the lactone melting in the range 91 to 93° C.

In practicing our invention with peracetic acid as the oxidant, from 1 to 2 molar equivalents thereof should be used, based on the molar amount of the 2-formyl-2'-biphenylcarboxylic acid to be converted. The solvent mixture of acetic and sulfuric acids should be in the ratio of about 5 to 1 of acetic to sulfuric by weight. The concentration of the carboxylic acid in the solution may be from about 150 g./l. to 200 g./l.

If hydrogen peroxide is the oxidant, a similar range of molar equivalent thereof is preferred but the concentration of the solution in acetic acid should be lower, say 125 g./l.

The presence of a small amount of sulfuric acid in the acetic-acid solution appears to be necessary to obtain a good yield and a relatively quick reaction.

The lactone may be applied or compounded by a variety of methods to or with any material which is subject to attack by rodents, so that damage from these pests is decreased or prevented. Packaging material, such as wooden or paper boxes and paper, fiber, or plastic bags, growing crops, building materials, synthetic or natural fibrous materials, dyes, paints, lacquers, waxes and plastics are included in articles that may be treated.

Application may be as a dust composed of 10% of the compound and 90% of an inert material (e.g., clay) or as a liquid composed of a 10% solution in an organic solvent (e.g., acetone, alcohol, aromatic hydrocarbon, etc.) which is spread by spraying, brushing or rolling. The compound may be dispersed in water with a surface-active agent or melted at the temperature of boiling water for application. The compound may be added to materials by the use of an aqueous solution of the ammonium salt of 2-hydroxy-2'-biphenylcarboxylic acid. Heating the impregnated material at 125° C. drives off water and ammonia to leave the lactone in the product. A material may be impregnated with an aqueous solution of the sodium salt of 2-hydroxy-2'-biphenylcarboxylic acid, from which acidification will precipitate the lactone within the material. This compound may be incorporated in manufactured materials, such as paper, during their formation by, for example, adding it to the pulp during processing.

In surface coating, the limits of the amount of the active compound to be applied are 0.1 to 100 pounds per 1000 square feet of the surface to be protected; the most likely commercial range is between 1 and 20 pounds, and the preferred range between 5 and 15 pounds. Expressed in terms of weight percent of the final product, the limits of the amount of the compound contained in the material are between 0.05 and 20.0 weight percent; the most likely commercial range is between 0.25 and 10 weight percent, and the preferred range between 0.5 and 5 weight percent.

The rodent repellency of the lactone is shown by the following tests. Rats were permitted to feed for four days on 20 grams of bait containing 2.0 weight percent of the compound and on an equal amount of untreated bait. Having eaten the untreated bait in little more than a day, the rats ate nothing during the remainder of the test period rather than touch the treated food. The compound was then tested at 0.5 weight percent concentration in bait and found to have essentially the same activity as at the 2.0 weight percent level.

The lactone dissolved in acetone was applied to burlap bags at a concentration of 5.0 mg./sq. in. and tested with individually caged house mice against untreated control bags. There was a 52% reduction in damage of the treated bags compared to the untreated.

While we have shown and described certain preferred practices of the invention, it is apparent that other modifications may arise. Therefore, we do not wish to be limited to the disclosure set forth but only by the scope of the appended claims.

We claim:
1. A method of making 2,2'-biphenyl lactone comprising dissolving in acetic acid a biphenyl compound selected from the group consisting of 2-formyl-2'-biphenylcarboxylic acid, methyl 2-formyl-2'-biphenylcarboxylate and the dimethyl acetal thereof, reacting therewith in the presence of sulfuric acid an oxidant selected from the group consisting of peracetic acid and hydrogen peroxide, and recovering from the solution the 2,2'-biphenyl lactone thereby formed.

2. A method as defined in claim 1, characterized by effecting said recovery by pouring the reaction mixture into about 10 volumes of water per volume of reaction mixture and filtering off the lactone precipitated thereby.

3. A method as defined in claim 1, characterized by effecting said recovery by distilling off substantially all the acetic acid solvent, refluxing the residue with a solution containing at least two moles of sodium hydroxide per mole of biphenyl compound, filtering to remove insoluble material, and neutralizing the filtrate to precipitate the lactone.

No references cited.